(12) United States Patent
Cheng

(10) Patent No.: US 10,849,431 B2
(45) Date of Patent: Dec. 1, 2020

(54) SMART CHAIR

(71) Applicant: Chung-Sheng Cheng, Taoyuan (TW)

(72) Inventor: Chung-Sheng Cheng, Taoyuan (TW)

( * ) Notice: Subject to any disclaimer, the term of this patent is extended or adjusted under 35 U.S.C. 154(b) by 0 days.

(21) Appl. No.: 16/386,936

(22) Filed: Apr. 17, 2019

(65) Prior Publication Data

US 2019/0328141 A1    Oct. 31, 2019

(30) Foreign Application Priority Data

Apr. 26, 2018  (TW) .............................. 107114213 A

(51) Int. Cl.
| | |
|---|---|
| *B64D 11/06* | (2006.01) |
| *A47C 7/72* | (2006.01) |
| *H02J 7/02* | (2016.01) |
| *H01R 27/02* | (2006.01) |
| *H01R 25/00* | (2006.01) |
| *H02J 7/00* | (2006.01) |

(52) U.S. Cl.
CPC ............ *A47C 7/72* (2013.01); *B64D 11/0624* (2014.12); *H01R 25/006* (2013.01); *H01R 27/02* (2013.01); *H02J 7/0063* (2013.01); *H02J 7/025* (2013.01)

(58) Field of Classification Search
CPC .............................. B64D 11/0624; A47C 7/72
See application file for complete search history.

(56) References Cited

U.S. PATENT DOCUMENTS

| | | | | |
|---|---|---|---|---|
| 8,061,864 B2* | 11/2011 | Metcalf | .................. | A47B 21/00 362/127 |
| 10,116,106 B2* | 10/2018 | Byrne | .................. | A47C 21/003 |
| 10,476,216 B2* | 11/2019 | Byrne | .................. | H01R 25/006 |
| 2008/0073953 A1* | 3/2008 | Tamara | ..................... | A47C 7/72 297/217.4 |
| 2008/0111408 A1* | 5/2008 | Duran | ..................... | A63F 13/98 297/217.4 |
| 2011/0247135 A1* | 10/2011 | Herman | ............... | A61G 7/0507 5/425 |
| 2012/0180216 A1* | 7/2012 | Seehoff | .................. | A47C 21/00 5/503.1 |
| 2012/0312196 A1* | 12/2012 | Newkirk | .................. | H02J 50/12 108/23 |
| 2013/0234481 A1* | 9/2013 | Johnson | .................. | H02J 7/025 297/217.3 |

(Continued)

FOREIGN PATENT DOCUMENTS

| | | |
|---|---|---|
| TW | M510678 U | 10/2015 |
| TW | M558564 U | 4/2018 |
| TW | M565523 U | 8/2018 |

OTHER PUBLICATIONS

Office Action dated Aug. 24, 2018 of the corresponding Taiwan patent applicaiton.

*Primary Examiner* — Timothy J Brindley
(74) *Attorney, Agent, or Firm* — Chun-Ming Shih; HDLS IPR Services

(57) ABSTRACT

A smart chair includes a seat and a power supply device installed to the seat. The power supply device is electrically coupled to a voltage detection unit and a voltage adjustment unit. The voltage detection unit is provided for detecting a load signal, and the voltage adjustment unit is provided for adjusting and outputting a DC voltage according to the load signal. The concepts of resting, leisure and business are combined to provide a chair capable of detecting and outputting an appropriate DC voltage automatically.

16 Claims, 3 Drawing Sheets

(56) References Cited

U.S. PATENT DOCUMENTS

| | | | | |
|---|---|---|---|---|
| 2016/0338495 A1* | 11/2016 | Purintun | ............... | A47C 7/004 |
| 2017/0025803 A1* | 1/2017 | Abbinante | ............ | B64D 47/00 |
| 2017/0135490 A1* | 5/2017 | Andrix | ................ | H02J 7/0042 |
| 2017/0141600 A1* | 5/2017 | Kuczek | ............. | B64D 11/0624 |
| 2017/0155259 A1* | 6/2017 | Mecca | ................. | A47B 21/04 |
| 2017/0164742 A1* | 6/2017 | Hay | ..................... | A47C 7/744 |
| 2018/0041354 A1* | 2/2018 | Nelson | ................. | G06F 3/167 |
| 2018/0148177 A1* | 5/2018 | Smallhorn | ......... | B64D 11/0624 |
| 2018/0191113 A1* | 7/2018 | Byrne | ................. | H02G 3/0493 |
| 2018/0191178 A1* | 7/2018 | Byrne | ................. | A47C 17/86 |
| 2018/0248404 A1* | 8/2018 | Pinewski | .............. | A47B 21/06 |
| 2018/0271287 A1* | 9/2018 | Jacobs | ................. | A47C 1/12 |
| 2018/0332953 A1* | 11/2018 | Solomon | ................ | A47C 4/20 |
| 2018/0352875 A1* | 12/2018 | Riehl | .................... | A41D 1/005 |
| 2019/0125074 A1* | 5/2019 | Cheng | .................. | A47B 21/06 |
| 2019/0145153 A1* | 5/2019 | Edelman | ............... | A47C 7/622 |
| | | | | 297/188.01 |
| 2020/0108934 A1* | 4/2020 | Williamson | ....... | B64D 11/0627 |

* cited by examiner

SMART CHAIR

BACKGROUND OF THE INVENTION

1. Technical Field

The technical field relates to a smart chair, and more particularly to the smart chair capable of detecting and supplying DC power.

2. Description of Related Art

With the advancement of technologies and the development of the Internet, various electronic devices such as smart phones, tablet PCs, cameras or wearable devices are introduced to improve our living standard and bring considerable convenience to our daily life. When people go out with the aforementioned electronic devices, run out of battery or power and need to deal with important matters, it is necessary to find a place to charge the electronic devices or buy a mobile power supply to solve the problem. However, there are already many places such as administrative agencies, MRT stations, bus stops or sightseeing spots which have temporary charging stations provided for free charging, so that people no longer have to worry about the aforementioned electronic devices running out of power or even having to buy the mobile power supply.

Most of the existing temporary charging stations are vertical base stations with a plurality of sockets and various types of transmission cables for different specifications. The charging may be conducted via a cable or wireless method. Since the temporary charging stations do not have chairs, people usually charge their electronic device while standing or squatting. Obviously, such design is insufficient. Therefore, related manufacturers have developed a chair with a charging function, and such chair is a multifunctional chair that combines the concepts of resting, leisure, and business. However, the aforementioned multifunctional chair is not applicable for various types of electronic devices. Particularly, people still need to prepare an additional AC/DC adapter and its transmission cable for the charging process, since the chair does not come with a voltage detection function to supply appropriate voltage and current.

In view of the aforementioned shortcomings of the prior art, the discloser of this disclosure based on years of experience in the related industry to conduct extensive research and experiment, and provided a feasible solution to overcome the shortcomings of the prior art.

SUMMARY OF THE INVENTION

This disclosure is directed to a smart chair that combines the concepts of resting, leisure, and business and has the function of detecting and outputting appropriate DC voltage automatically.

To achieve the aforementioned and other objectives, this disclosure provides a smart chair comprising a seat, and a power supply device installed to the seat, wherein the power supply device is electrically coupled to a voltage detection unit and a voltage adjustment unit, and the voltage detection unit is provided for detecting a load signal, and the voltage adjustment unit adjusts an output DC voltage according to the load signal; the smart chair further comprises at least one socket coupled to the power supply device, and the seat comprise a seat surface, a back coupled to the seat surface, and two armrests coupled to the seat surface, and the socket is selectively installed in the seat surface, the back or one of the armrests, and the socket comprises a circuit board and a plurality of ports electrically coupled to the circuit board.

This disclosure has the following effects. The power supply device of this disclosure comprises a voltage detection unit, a voltage adjustment unit, and a control unit. The voltage detection unit is capable of generating a load signal according to the connected load, and the control unit controls the voltage adjustment unit to remain unaffected by a change of the input voltage or a change of the load voltage and is capable of supplying a stable output DC voltage to the load. The voltage adjustment unit has the functions of transforming, rectifying, filtering, and adjusting an AC power and the function of outputting a DC voltage stably. Therefore, the power supply device can supply appropriate DC voltage without requiring the use of an additional AC/DC adapter, and can charge other electronic devices or electric appliances quickly, stably and conveniently.

DESCRIPTION OF THE PREFERRED EMBODIMENTS

The technical contents of this disclosure will become apparent with the detailed description of preferred embodiments accompanied with the illustration of related drawings as follows. It is intended that the embodiments and drawings disclosed herein are to be considered illustrative rather than restrictive.

Figure 1:
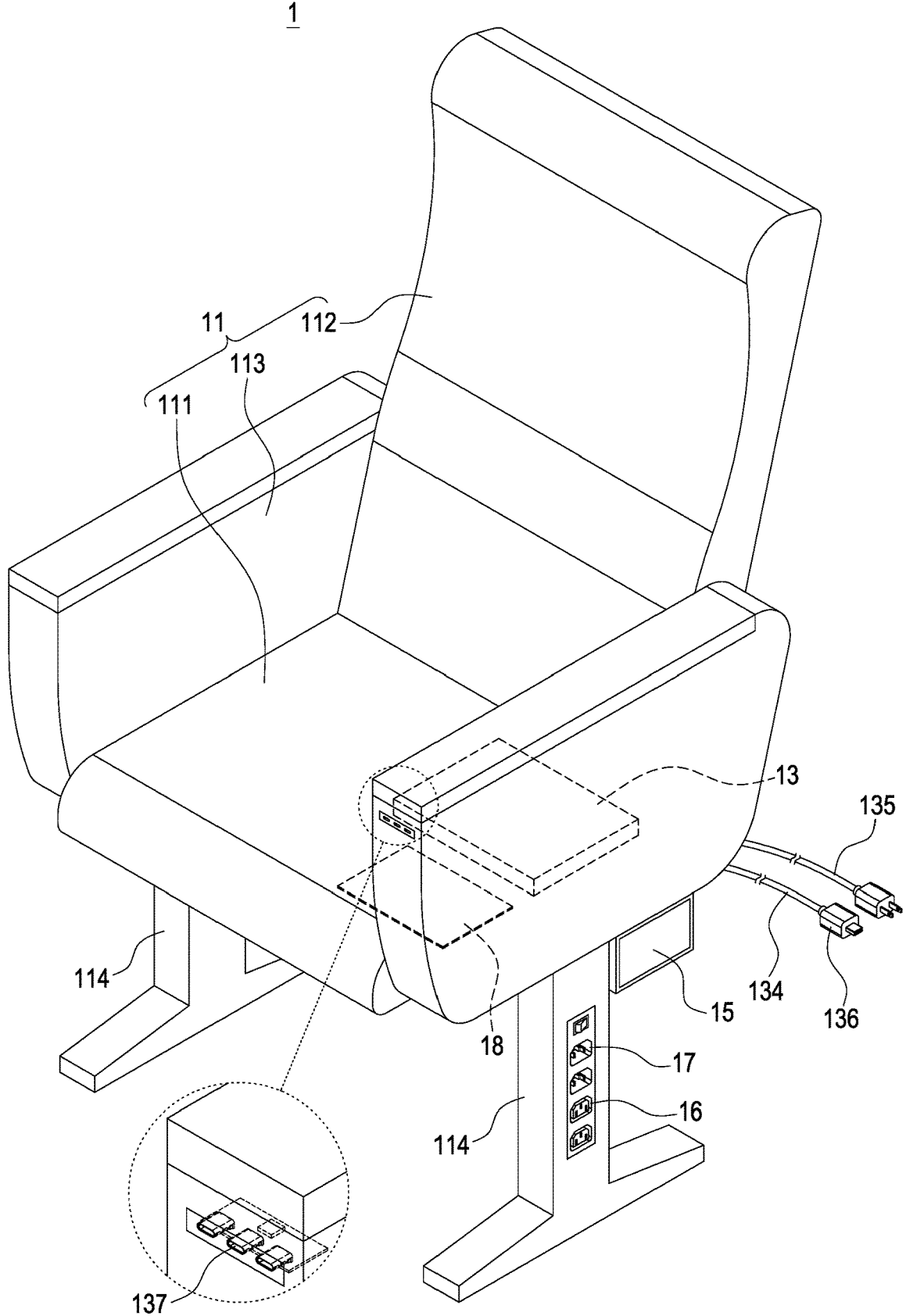
FIG. 1 is a perspective view of a smart chair of this disclosure.
Figure 2:
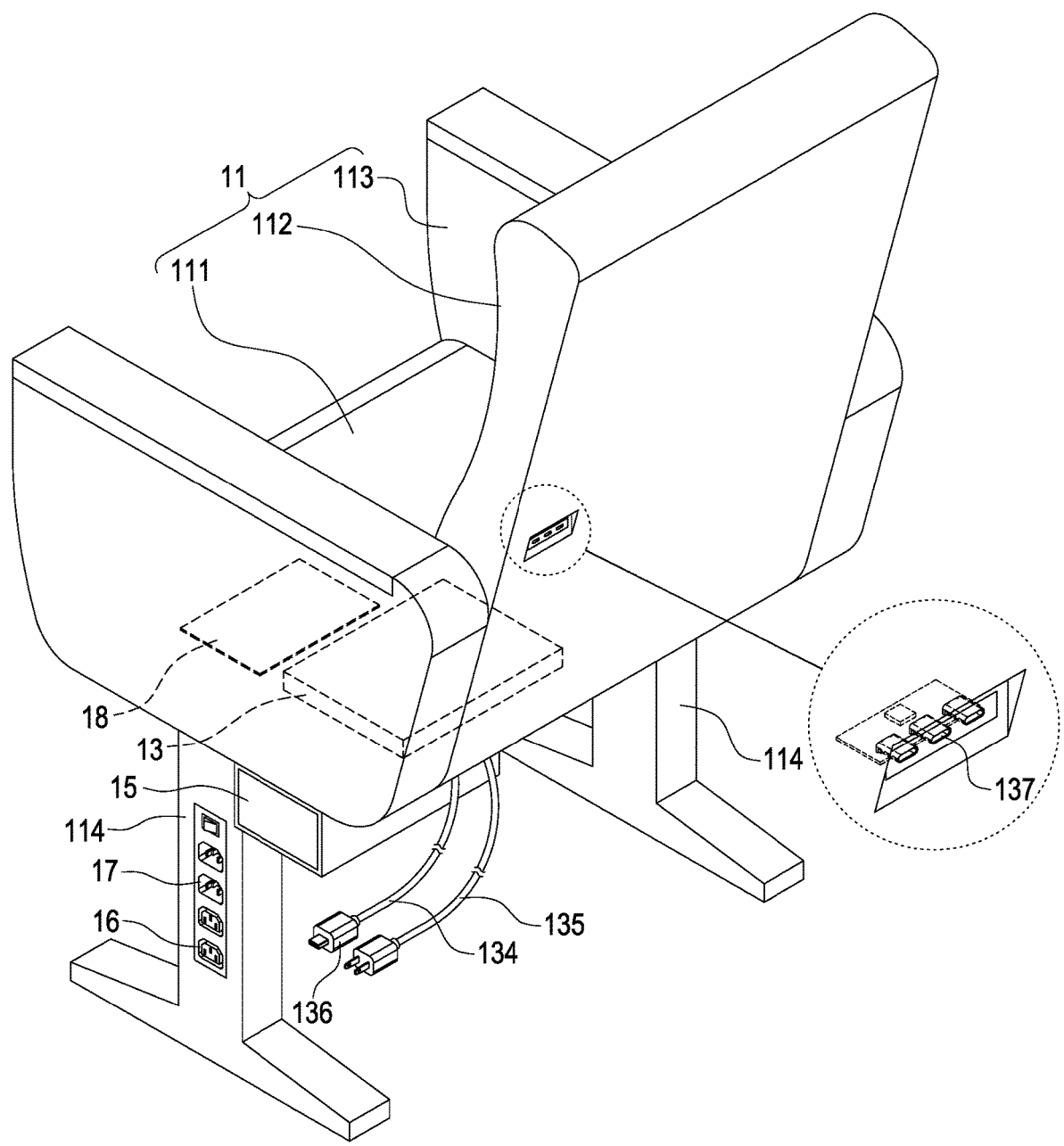
FIG. 2 is another perspective view of a smart chair of this disclosure.
Figure 3:
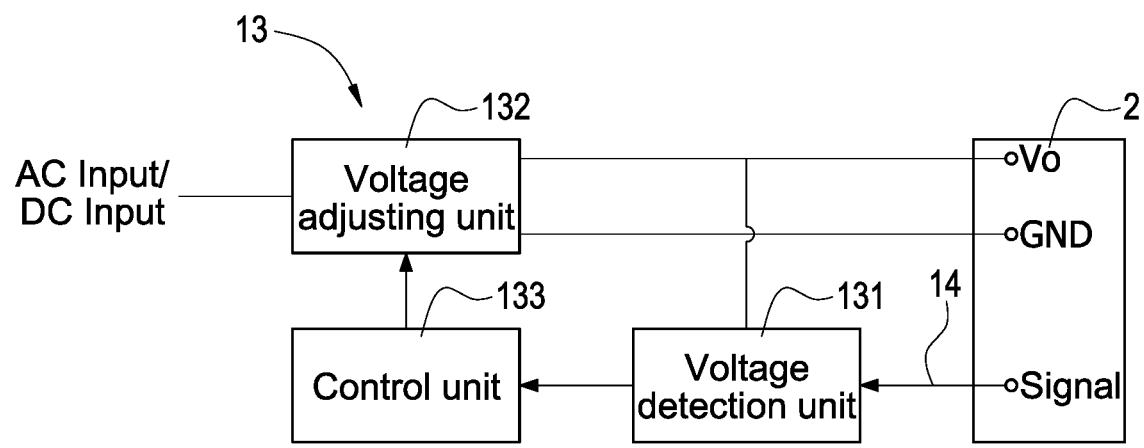
FIG. 3 is a circuit block diagram of a power supply device of a smart chair of this disclosure.

With reference to FIGS. 1 to 3 for a smart chair of this disclosure, the smart chair 1 comprises a seat 11. The seat 11 preferably comprises a seat surface 111, a back 112 coupled to the seat surface 111, two armrests 113 coupled to the seat surface 111, and at least one leg 114 supportively coupled to the bottom side of the seat surface. In other embodiments, the seat 11 includes, but not limited to a bench, a sofa, or a chair in any other form. The structure of the smart chair of this disclosure smart chair 1 will be described in details below.

The seat 11 comprises a power supply device 13 of the seat 11. Since the DC voltage provided by the power supply device 13 of this embodiment is not affected by factors such as the so-called peak value, power factor, frequency difference, and harmonic interference of the present existing AC power. Compared with the AC power, the DC voltage has the advantages of high stability, low cost, easy storage, fast charging speed, and high efficiency.

In the figures, the power supply device 13 is electrically coupled to a voltage detection unit 131 and a voltage adjustment unit 132. The voltage detection unit 131 is provided for detecting a load signal 14, and the voltage adjustment unit 132 is provided for adjusting an output DC voltage (not shown) according to the load signal 14. In an embodiment as shown in FIG. 3, the power supply device 13 further comprises a control unit 133 coupled to the voltage detection unit 131 and the voltage adjustment unit 132. The control unit 133 identifies the load signal 14 and controls the voltage adjustment unit 132 to output the required DC voltage.

Specifically, if a certain load 2 is electrically coupled to the power supply device 13, the voltage detection unit 131 will detect and transmit the load signal 14 to the control unit 133, and the control unit 133 will simultaneously control and use the voltage adjustment unit 132 to adjust and output the corresponding DC voltage to the load 2 according to the load signal 14. In another embodiment, if the load signal 14 such as a resistance or current (signal) of the connected load 2 detected by the voltage detection unit 131 is changed, the control unit 133 will control the voltage adjustment unit 132 not to be affected by the change of voltage or the change of load voltage and the power supply device will be able to supply a corresponding stable output DC voltage to the load 2. Wherein, the DC voltage may be over 5 volts such as 9 volts, 12 volts, 20 volts or any other appropriate voltage value, but this disclosure is not limited to the aforementioned volts only. The load 2 includes but not limited to a smart phone, a tablet PC, a camera, a wearable device, or an electronic device.

In addition, the seat 11 further comprises a power storage unit 15 for supplying electric power to the power supply device 13, a transmission cable 134 externally coupled to the power supply device 13 and at least one socket 137 coupled to the power supply device 13, wherein an end of the transmission cable 134 is coupled to a plug 136. Further, the power supply device 12 is coupled to the mains electricity to supply electric power through an externally connected power cable 135.

The power storage unit 15 is selectively installed on the bottom surface of the seat 11. In an embodiment as shown in FIGS. 1 and 2, the power storage unit 15 is preferably installed on the bottom surface of the seat surface 111. In other embodiments, the power storage unit 15 may be installed in the seat surface 111, on the leg 114, or at any other appropriate position, and this disclosure is not limited to the aforementioned arrangement only. The socket 137 is preferably configured and exposed from the surface of the seat 11. In the embodiment as shown in FIG. 1, the socket 137 is disposed on a front surface of the armrest 113 to let users sit comfortably while charging a load 2, so as to achieve a multifunctional user-friendly effect. In the embodiment as shown in FIG. 2, the socket 137 may be disposed on the back side of the back 112 such as a seat in an airplane, and the socket 137 is provided for travelers at the backseat to charge their electronic devices.

In this embodiment, the plug 136 is preferably a connector plug such as a USB plug, a lighting plug or any other appropriate plug; the socket 137 is preferably a connector socket such as a USB socket, a lighting socket or any other appropriate socket and comprises a circuit board 1371 and a plurality of ports 1372 electrically coupled to circuit board 1371. The power storage unit 15 includes, but not limited to, a disposable lithium battery, a rechargeable battery, or a lithium-ion battery. Regardless of the type of battery of the power storage unit 15, the voltage adjustment unit 132 of the power supply device 13 can convert the supplied power into DC power to facilitate users to charge their electronic devices.

It is noteworthy that the voltage detection unit 131, the voltage adjustment unit 132 and the control unit 133 are preferably built in the power supply device 13. In other embodiments, the voltage adjustment unit 132 may be detachably coupled to the power supply device 12 by an electric wire (not shown in the figure). In the embodiment as shown in FIGS. 1 and 2, the power supply device 13 is selectively embedded into the seat surface 111, the back 112 or one of the armrests 113, but this disclosure is not limited to such arrangement. Therefore, the smart chair 1 of this embodiment is a chair the combines the concepts of resting, leisure, and business and is used in administrative agencies, MTR stations, bus stations, trains, airplanes or sightseeing spots, or even office chairs while allowing users to charge a load 2 and providing a diversified effect.

In addition, this embodiment further comprises at least one DC power socket 16 and at least one AC power socket 17 electrically coupled to the power supply device 13 for and provided for other electronic devices that require a DC voltage or other electric appliances that require an AC voltage. In the embodiment as shown in FIGS. 1 and 2, the DC power socket 16 and the AC power socket 17 are arranged side-by-side or separately embedded into a surface of the leg 114. If an electric appliance is plugged into or connected to an AC power socket 17, power will be supplied directly from the power storage unit 15 or through a connected power supply device 13 after a control unit 133 installed in the power supply device regulates/withstands a voltage before the power is supplied to the electric appliance.

To facilitate a wireless charging application of a load 2 (or various types of electronic devices), this embodiment further comprises a wireless charging module 18 electrically coupled to the power supply device 13 to avoid connecting too many transmission cables 134 and giving rise to a cable management/storage issue. In FIGS. 1 and 2, the wireless charging module 18 is embedded into the seat surface 111 of the seat 11. After receiving the electric power of the power supply device 12, a charging area (not shown) will be formed above the seat surface 111 near the wireless charging module, and a wireless power generation is produced by the principle of electromagnetic resonance, and the power so generated is provided for the wireless charging of the load 2 (or various types of electronic devices).

As to the smart functions of the smart chart of this embodiment smart chair 1, the DC power socket 16, AC power socket 17, wireless charging module 18 and socket 137 can be selected as needed and embedded into an appropriate position of the seat 11. However, this disclosure is not limited by this embodiment.

While this disclosure has been described by means of specific embodiments, numerous modifications and variations could be made thereto by those skilled in the art without departing from the scope and spirit of this disclosure set forth in the claims.

What is claimed is:

1. A smart chair, comprising a seat, and a power supply device installed to the seat and electrically coupled to a voltage detection unit and a voltage adjustment unit, and the voltage detection unit being provided for detecting a load signal, and the voltage adjustment unit adjusting an output DC voltage according to the load signal; the smart chair further comprising at least one socket coupled to the power supply device, and the seat comprising a seat surface, a back coupled to the seat surface, and two armrests coupled to the seat surface, and the socket being selectively installed in the seat surface, the back, or one of the armrests, and the socket comprising a circuit board and a plurality of ports electrically coupled to the circuit board, wherein the seat further comprises a power storage unit for supplying electric power to the power supply device, and the power storage unit is selectively installed on the bottom surface of the seat, and the power storage unit is a lithium battery, a battery, or a lithium-ion battery.

2. The smart chair of claim 1, wherein the power supply device further comprises a control unit installed therein and coupled to the voltage detection unit and the voltage adjustment unit, and the control unit recognizes the load signal and controls the voltage adjustment unit to output the required DC voltage.

3. The smart chair of claim 1, wherein the socket is a connector socket.

4. The smart chair of claim 1, wherein the DC voltage is 5 volts or above.

5. The smart chair of claim 1, wherein the seat further comprises a transmission cable externally coupled to the power supply device and a power cable, and an end of the transmission cable is coupled to a plug.

6. The smart chair of claim 5, wherein the plug is a connector plug.

7. The smart chair of claim 1, wherein the seat surface is coupled to at least one leg, and the leg is supportively coupled to the bottom side of the seat surface.

8. The smart chair of claim 7, further comprising at least one DC power socket and at least one AC power socket electrically coupled to the power supply device, and the DC power socket and the AC power socket are arranged side by side or separately embedded into the surface the leg.

9. The smart chair of claim 1, wherein the power supply device further comprises a control unit installed therein and coupled to the voltage detection unit and the voltage adjustment unit, and the control unit recognizes the load signal and controls the voltage adjustment unit to output the required DC voltage.

10. The smart chair of claim 1, wherein the socket is a connector socket.

11. The smart chair of claim 1, wherein the DC voltage is 5 volts or above.

12. The smart chair of claim 1, wherein the seat further comprises a transmission cable externally coupled to the power supply device and a power cable, and an end of the transmission cable is coupled to a plug.

13. The smart chair of claim 5, wherein the plug is a connector plug.

14. The smart chair of claim 1, wherein the seat surface is coupled to at least one leg, and the leg is supportively coupled to the bottom side of the seat surface.

15. The smart chair of claim 7, further comprising at least one DC power socket and at least one AC power socket electrically coupled to the power supply device, and the DC power socket and the AC power socket are arranged side by side or separately embedded into the surface the leg.

16. A smart chair, comprising a seat, and a power supply device installed to the seat and electrically coupled to a voltage detection unit and a voltage adjustment unit, and the voltage detection unit being provided for detecting a load signal, and the voltage adjustment unit adjusting an output DC voltage according to the load signal; the smart chair further comprising at least one socket coupled to the power supply device, and the seat comprising a seat surface, a back coupled to the seat surface, and two armrests coupled to the seat surface, and the socket being selectively installed in the seat surface, the back, or one of the armrests, the socket comprising a circuit board and a plurality of ports electrically coupled to the circuit board, and a wireless charging module electrically coupled to the power supply device, wherein the wireless charging module is embedded into the seat surface.

\* \* \* \* \*